United States Patent [19]

Shepard, Jr. et al.

[11] Patent Number: 5,306,579
[45] Date of Patent: Apr. 26, 1994

[54] BIFUNCTIONAL METAL-AIR ELECTRODE

[75] Inventors: V. Roger Shepard, Jr., Mableton; Yardlyne G. Smalley, Riverdale; R. Dennis Bentz, Marietta, all of Ga.

[73] Assignee: AER Energy Resources, Inc., Atlanta, Ga.

[21] Appl. No.: 969,433

[22] Filed: Oct. 30, 1992

[51] Int. Cl.$^5$ .............................. H01M 4/92
[52] U.S. Cl. ............................... 429/40; 429/42; 429/44
[58] Field of Search ........................ 429/40, 42, 44

[56] References Cited

U.S. PATENT DOCUMENTS

| | | | |
|---|---|---|---|
| 3,395,027 | 1/1976 | Warde et al. | 136/86 |
| 3,518,123 | 6/1970 | Katsoulis et al. | 136/86 |
| 3,650,837 | 3/1972 | Palmer | 136/86 |
| 3,749,748 | 9/1973 | Palmer | 136/86 |
| 3,756,980 | 7/1988 | Niksa et al. | 429/27 |
| 3,925,100 | 12/1975 | Buzzelli | 136/86 |
| 3,977,901 | 8/1976 | Buzzelli | |
| 4,054,725 | 10/1977 | Tuburaya | 429/29 |
| 4,105,830 | 8/1978 | Kordesch | 429/27 |
| 4,118,544 | 10/1978 | Przybyla | 429/27 |
| 4,152,489 | 5/1979 | Chottiner | 429/27 |
| 4,168,349 | 9/1979 | Buzzelli | 439/14 |
| 4,341,848 | 10/1982 | Liu et al. | 429/27 |
| 4,354,958 | 10/1982 | Solomon | 252/425.3 |
| 4,409,301 | 10/1983 | Angerer et al. | 429/27 |
| 4,444,852 | 4/1984 | Liu et al. | 429/29 |
| 4,456,521 | 6/1984 | Solomon et al. | 204/292 |
| 4,459,197 | 7/1984 | Solomon | 204/292 |
| 4,477,540 | 10/1984 | Miller et al. | 429/27 |
| 4,518,705 | 5/1985 | Solomon et al. | 502/101 |
| 4,615,954 | 10/1986 | Solomon et al. | 429/27 |
| 4,623,597 | 11/1986 | Sapru et al. | 429/101 |
| 4,927,514 | 5/1990 | Solomon et al. | 204/290 |
| 4,957,826 | 9/1990 | Cheiky | 429/27 |
| 5,032,473 | 7/1991 | Hoge | 429/42 |

OTHER PUBLICATIONS

Demczyk et al., Investigation of Carbon-Teflon Plaque Resistivities, Journal of Power Source, (vol. 6, 1981).
Demczyk et al., Potential Distribution on a Carbon-Based Bifunctional Air Electrode; Electrochemical Society and Technology, Jun. 1982.

Primary Examiner—Prince Willis, Jr.
Assistant Examiner—M. Nuzzolillo
Attorney, Agent, or Firm—Jones & Askew

[57] ABSTRACT

A bifunctional air-electrode for use in electrochemical energy cells discharges a satisfactory current on the first discharge cycle and operates for a relatively large number of charge-discharge cycles without gas forming between the electrolyte side of the air electrode and the electrolyte. The active layer of the electrode includes an oxygen reduction catalyst having a first oxygen evolution potential and an oxygen evolution catalyst having a second oxygen evolution potential less than the first oxygen evolution potential, the oxygen reduction catalyst being present in a greater concentration proximate the electrolyte side than proximate the air side and the oxygen evolution catalyst being present in a greater concentration proximate the air side than proximate the electrolyte side.

23 Claims, 2 Drawing Sheets

BIFUNCTIONAL METAL-AIR ELECTRODE

TECHNICAL FIELD

This invention relates to electrochemical cells and more particularly relates to rechargeable metal-air electrochemical cells.

BACKGROUND OF THE INVENTION

Metal-air cells are well-known and provide a relatively light-weight power supply. Metal-air cells utilize oxygen from ambient air as a reactant in an electrochemical reaction. Metal-air cells include an air permeable electrode as the cathode and a metallic anode surrounded by an aqueous electrolyte and function through the reduction of oxygen from the ambient air which reacts with the metal to generate an electric current. For example, in a zinc-air cell, the anode contains zinc, and during operation, oxygen from the ambient air is converted at the cathode to hydroxide, zinc is oxidized at the anode by the hydroxide, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between the anode and cathode of the cell and reversing the electrochemical reaction. During recharging, the cell discharges oxygen to the atmosphere through the air permeable cathode.

Early rechargeable metal-air cells included three electrodes, namely, an anode, a unifunctional cathode, and a counter-electrode. The unifunctional cathode was used only during discharge and was incapable of recharging the cells. The counter-electrode was required to recharge the cell. The use of a counter-electrode increased the dead-weight of the cell and reduced the energy density of the cell. To overcome this problem, bifunctional air electrodes were developed for use in metal-air cells. Bifunctional electrodes function in both the discharge mode and the recharge mode of the cell and eliminate the need for the third electrode. However, early bifunctional electrodes did not last long because the recharge reaction deteriorated the discharge system.

U.S. Pat. No. 4,341,848 to Lui et al discloses a bifunctional metal-air electrode comprising carbon particles, a bonding/non-wetting agent, and two types of catalyst, one for oxygen reduction during discharge and one for oxygen evolution during recharge. In that patent, the oxygen reduction catalysts include silver, platinum, platinum-ruthinium, nickel spinel, nickel perovskites, and iron, nickel, or cobalt macrocyclics. The oxygen evolution catalysts include tungsten compounds such as $CoWO_4$, $WC$, $WS_2$, and $WC$ containing fused cobalt. The oxygen reduction catalysts require a relatively high voltage to evolve oxygen. The oxygen evolution catalysts require a lower voltage to evolve oxygen. Thus, during recharging, the oxygen evolution catalysts function at the lower voltage to produce oxygen and recharge the cell and exclude the oxygen reduction catalysts from participating in the recharging reaction. Because the recharging is performed at the lower voltage, the cell deteriorates more slowly and is useful for more cycles than a cell that recharges at higher voltages.

One problem with conventional bifunctional electrodes is that such electrodes may evolve gas at the electrolyte side of the air cathode during discharge and form gas pockets between the air cathode and the electrolyte. In a nonflowing electrolyte system, the gas pockets interrupt the chemical reaction between the electrolyte and the air cathode and cause the cell to prematurely fail. Therefore, there is a need for a bifunctional air electrode that does not prematurely fail due to the production of gas between the electrolyte and the electrode. In addition, it is desired that such an electrode provide sufficient power production on the first discharge cycle and operate for a large number of discharge/recharge cycles.

SUMMARY OF THE INVENTION

The present invention satisfies the needs described above by providing a bifunctional air electrode comprising an oxygen reduction catalyst and an oxygen evolution catalyst wherein the concentration of the oxygen evolution catalyst varies from the electrolyte side to the air side of the electrode. More particularly, the bifunctional air electrode of the present invention comprises an active layer having an electrolyte side and an air side and including an oxygen reduction catalyst having a first oxygen evolution potential and an oxygen evolution catalyst having a second oxygen evolution potential less than the first oxygen evolution potential, the oxygen evolution catalyst being present in a greater concentration proximate the air side than proximate the electrolyte side. The bifunctional air electrode of the present invention further comprises a current collector in electrical contact with the active layer and a wet-proofing layer laminated to the air side of the active layer. Advantageously, the bifunctional air electrode invention produces a satisfactory current in a metal-air cell during the first discharge cycle, does not produce gas pockets between the electrolyte side of the electrode and the electrolyte, and performs effectively for a large number of charge-discharge cycles.

Preferably, the oxygen reduction catalyst is present in a greater concentration proximate the electrolyte side of the electrode of the present invention than proximate the air side. Stated more particularly, the bifunctional air electrode of the present invention preferably includes an oxygen reduction catalyst having an oxygen potential greater than about 2.1 volts and an oxygen evolution catalyst having an oxygen evolution potential of less than 2 volts. These voltages are particularly preferred for a zinc-air cell. Thus, a metal-air cell containing the electrode can be recharged at the lower potential so that the metal-air cell deteriorates more slowly than if recharged at the higher voltage. In addition, the bifunctional air electrode of the present invention has varied concentrations of the respective catalysts from the electrolyte side of the active layer to the air side of the active layer such that the concentration of the oxygen reduction catalyst in the active layer preferably is at least 0.5% greater at the electrolyte side than at the air side and the concentration of the oxygen evolution catalyst in the active layer is at least about 2% greater at the air side than at the electrolyte side. Furthermore, the oxygen reduction catalyst is preferably present throughout the active layer of the electrode in a total amount effective to produce a sufficient amount of current from a secondary metal-air cell on the first discharge cycle and the oxygen evolution catalyst is preferably present in an amount sufficient to carry the recharge reaction of a secondary metal-air cell and exclude the oxygen reduction catalyst from the recharge reaction. Even more particularly, the oxygen evolution catalyst is preferably present proximate the electrolyte side of the electrode in a concentration less than about 5% by weight.

A suitable oxygen reduction catalyst includes silver, cobalt oxides, transition metal macrocyclics, spinels, and perovskites. More particularly, suitable oxygen reduction catalysts include CoTMPP, $LaNi_{1-x}Co_xO_y$, and $Co_xO_y$. Platinum catalysts are also suitable oxygen reduction catalysts. Suitable oxygen evolution catalysts include tungsten compounds such as WC, $FeWO_4$, $WS_2$, and WC with 1 to 20 weight percent Co. NiS is another suitable oxygen reduction catalyst.

The bifunctional air electrode of the present invention may also include an oxygen adsorptive material such as carbon particles. A suitable such material is carbon black which also may be a carrier for some catalysts. The bifunctional air electrode of the present invention may further include a non-wetting agent or binder, such as polytetrafluoroethylene, and a conductive filler material such as carbon fibers.

In a preferred embodiment of the bifunctional air electrode of the present invention, the active layer includes a first sublayer positioned adjacent to the electrolyte and a second sublayer positioned adjacent to the wetproofing layer. The oxygen reduction catalyst is present in a greater concentration in the first sublayer than in the second sublayer and the oxygen evolution catalyst is present in a greater concentration in the second sublayer than in the first sublayer.

Accordingly, an object of the present invention is to provide an improved bifunctional air electrode.

Another object of the present invention is to provide a bifunctional air electrode which does not produce gas pockets between the electrolyte side of the electrode and the electrolyte in a secondary metal-air cell.

A further object of the present invention is to provide a bifunctional air electrode which produces a sufficient current on the first discharge cycle of a secondary metal-air cell.

Still another object of the present invention is to provide a bifunctional air electrode which functions effectively for a large number of charge-discharge cycles.

Other objects, features and advantages of the present invention will become apparent from the following detailed description, drawings, and claims.

DETAILED DESCRIPTION OF THE INVENTION

Figure 1:
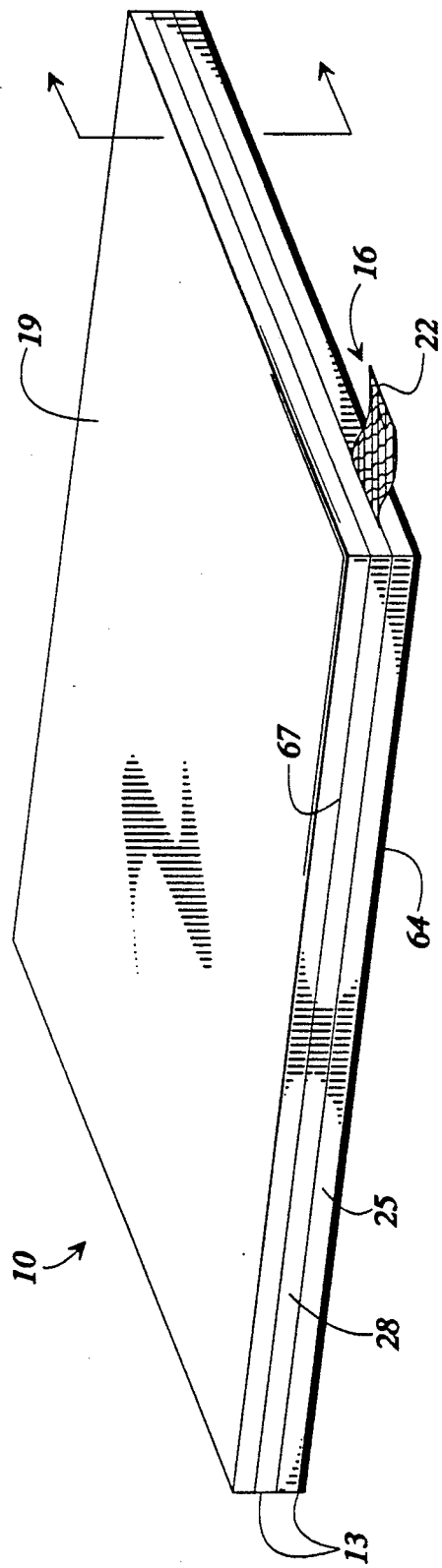
FIG. 1 is a perspective view of a bifunctional air electrode made according to a preferred embodiment of the present invention.
Figure 2:
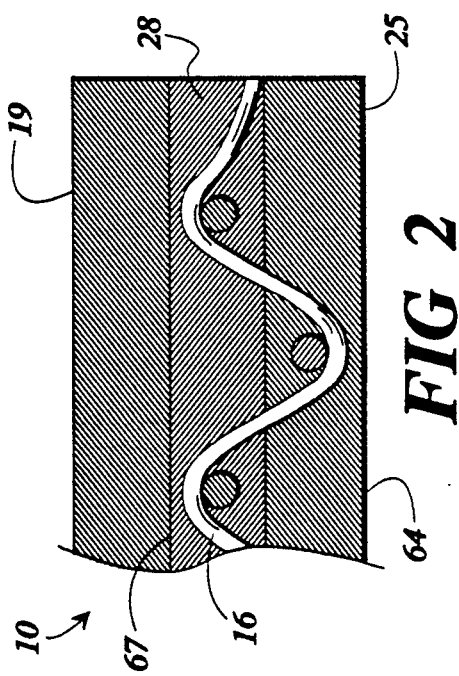
FIG. 2 is a partial, cross-sectional, elevation view of the air electrode shown in FIG. 1.

Turning to FIGS. 1 and 2, a bifunctional air electrode 10 made according to a preferred embodiment of the present invention is shown and comprises an active layer 13 formed about a current collector 16 and a wetproofing layer 19 laminated to the active layer 13. The current collector has a lead 22 which extends from the air electrode 10. The active layer 13 of the air electrode 10 includes a first sublayer 25 and a second sublayer 28 packed between the first sublayer and the wet-proofing layer 19.

Figure 3:
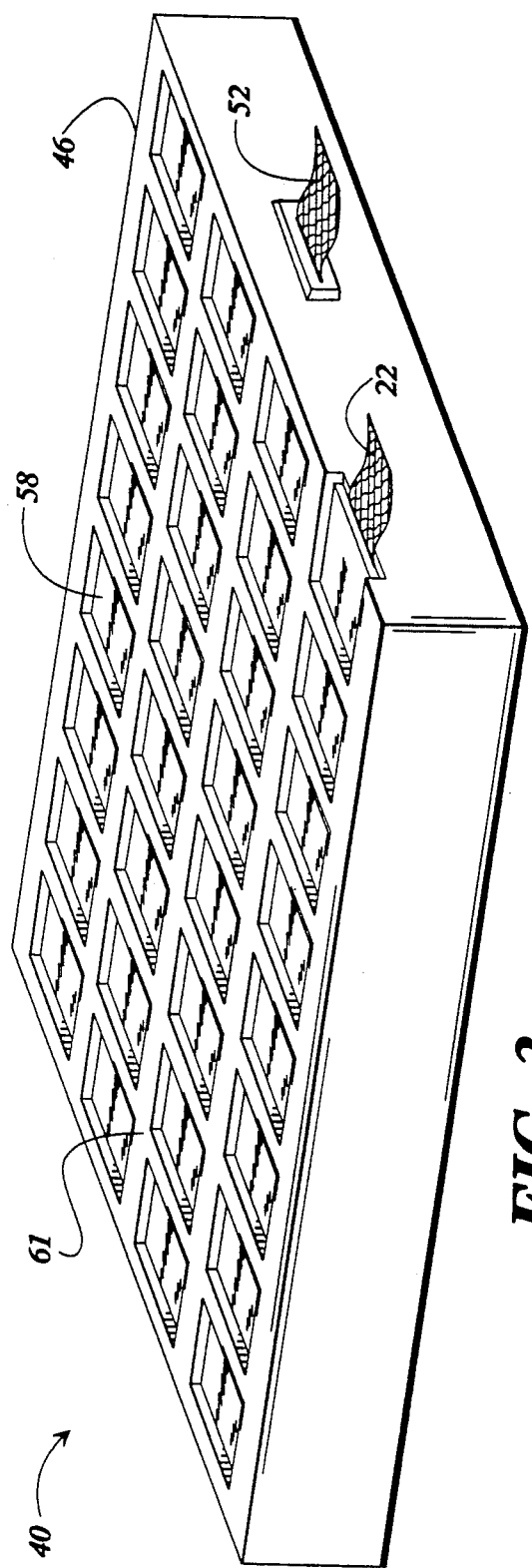
FIG. 3 is a perspective view of a secondary metal-air cell including the air electrode shown in FIG. 1.
Figure 4:
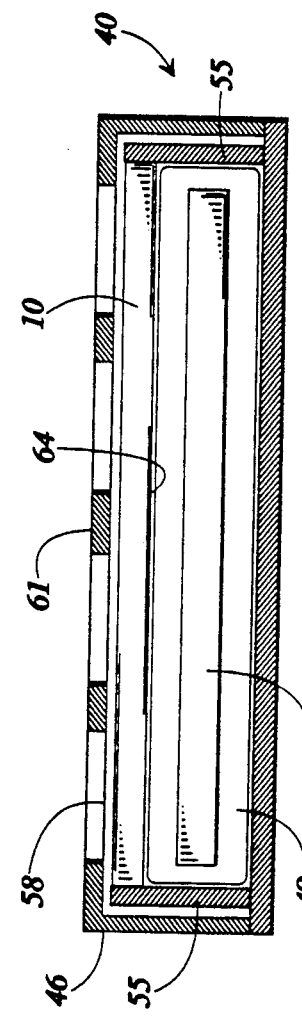
FIG. 4 is a partial, cross-sectional, elevation view of the metal-air cell shown in FIG. 3.

The composition and method for making the bifunctional air electrode 10 are described hereinbelow. First, a suitable secondary metal-air cell 40 for use with the bifunctional air electrode 10 shown in FIGS. 3 and 4 is described. The metal-air cell 40 includes the air electrode 10 which functions as a cathode, an anode 43, and an electrolyte disposed in a cell case 46.

A suitable anode is a wrapped, zinc anode such as that disclosed in U.S. Pat. No. 4,957,826, the disclosure of which is expressly incorporated herein by reference. The anode 43 is wrapped in a sheet 49 of absorbent, wettable, oxidation-resistant woven or nonwoven cloth, such as cotton, rayon, modified CMC or wettable plastic fibers. The sheet 49 is soaked in a suitable electrolyte such as an aqueous base including a group I metal hydroxide such as LiOH, NaOH, KOH, CsOH, or the like, as disclosed in U.S. Pat. No. 4,957,826. The anode 43 includes a metallic current collector screen which has a lead 52 extending from the cell case 46.

A rectangular support 55 fits about the periphery of the wrapped anode 43 and the air electrode 10 within the cell case 46. A gas-permeable, liquid-impermeable membrane 58 fits between the cell case 46 and the air electrode 10. The membrane 58 also fits between the cell case 46 and the rectangular support 55. A suitable material for the membrane 58 is TYVEK microporous polypropylene membrane available form DuPont in Wilmington, Del.

The cell case 46 also includes an open grid 61 which exposes the membrane 58 covering the air electrode 10 to ambient air.

The air electrode 10 is disposed in the cell case 46 so that the first sublayer 25 of the active layer 13 is positioned toward the electrolyte in the cell 40 and the wet-proofing layer 19 is positioned toward the ambient air. The wet-proofing layer 19 is exposed to the ambient air through the open grid 61 and gas permeable membrane 58. The active layer 13 of the air electrode 10 thus has an electrolyte side 64 which is positioned toward the electrolyte and an air side 67 which is positioned toward the wet-proofing layer 19 and the ambient air. As will be discussed in more detail below, the air electrode 10 includes an oxygen reduction catalyst and an oxygen evolution catalyst, the oxygen reduction catalyst being present in a greater concentration proximate the electrolyte side 64 of the air electrode than proximate the air side 67 of the air electrode and the oxygen evolution catalyst being present in a greater concentration proximate the air side of the air electrode than proximate the electrolyte side of the air electrode.

Generally described, the active layer 13 of the bifunctional air electrode 10 includes a mixture of one or more oxygen reduction catalysts, one or more oxygen evolution catalysts, oxygen adsorptive particulate material such as carbon particles, a conductive filler material such as carbon fibers, and a binder/non-wetting agent. The conductive filler material is optional. Both the first sublayer 25 and the second sublayer 28 of the active layer 13 preferably include each of the foregoing materials. The oxygen reduction catalyst and oxygen evolution catalyst preferably are distributed throughout the active layer 13 of the air electrode 10.

The oxygen reduction catalyst is of a type and present in an amount effective to produce a satisfactory level of current on the first and subsequent discharge cycles of the metal-air cell in which the air electrode is used. Preferably, the oxygen reduction catalyst has an oxygen evolution potential greater than about 2.1 volts. Suitable oxygen reduction catalysts include silver, cobalt oxides, having the formula $Co_xO_y$, transition metal macrocyclics such as cobalt tetramethoxyphenylporphyrin (CoTMPP), spinels, and perovskites such as lanthinum/nickel/cobalt oxide ($LaNi_{1-x}Co_xO_y$), and mixtures thereof. Platinum catalysts are also suitable, but are less desirable because of the higher cost.

Suitable oxygen evolution catalysts are of a type and present in an amount effective to evolve oxygen during recharge and carry the electrolytic reaction during recharge at a lower oxygen evolution potential than that of the oxygen reduction catalysts so that the oxygen reduction catalysts do not participate in the electrolytic recharge reaction. The oxygen evolution catalysts preferably have an oxygen evolution potential less than about 2 volts. Suitable oxygen evolution catalysts include tungsten compounds, such as tungsten carbide (WC), tungsten carbide with 1 to 20% by weight fused cobalt, tungsten sulfide ($WS_2$), and tungstate compounds such as $CoWO_4$ and $FeWO_4$, and mixtures thereof. Another suitable oxygen evolution catalyst is nickel sulfide (NiS) which also protects the silver catalyst. The oxygen evolution catalysts are preferably present throughout the active layer 13 of the air electrode 10 in an amount sufficient to prevent the oxygen reduction catalysts from participating in the electrolytic reaction during recharge of the cell to reduce the rate of deterioration of the air electrode and extend the number of useful charge-discharge cycles and overall useful life of the cell.

To prevent the evolution of gas pockets between the electrolyte side 64 of the air electrode active layer 13 and the electrolyte in the metal-air cell, the concentrations of the oxygen reduction catalyst and the oxygen evolution catalyst are varied from the electrolyte side of the active layer to the air side 67 of the active layer. As explained above, the oxygen reduction catalyst is present in a greater concentration proximate the electrolyte side 64 of the active layer 13 than proximate the air side 67 of the active layer and the oxygen evolution catalyst is present in a greater concentration proximate the air side of the active layer than proximate the electrolyte side of the active layer. Preferably, the concentration of the oxygen reduction catalyst in the active layer is at least 0.5% greater at the electrolyte side 64 than at the air side 67 and the concentration of the oxygen evolution catalyst in the active layer is at least about 2% greater at the air side than at the electrolyte side.

The oxygen adsorptive particles in the active layer 13 of the air electrode 10 are preferably carbon black. Suitable carbon black has a surface area greater than 20 square meters per gram. Preferably, the carbon black is a fluffy form of carbon black comprising discrete particles in a chain-like structure such as SHAWINIGAN acetylene black which has a surface area from about 30 to about 300 square meters per gram and is available from Chevron Chemical Company. SHAWINIGAN AB-50 acetylene black is particularly preferred. The carbon black is preferably treated with oxygen reduction catalysts CoTMPP and (optionally) silver. First, the carbon black is silverized by precipitating silver on the carbon via the addition of $AgNO_3$ to an aqueous slurry of carbon in the presence of hydrazine ($NH_2NH_2$). CoTMPP is then heat sintered to the silverized carbon black by heating a mixture of the silverized carbon black and CoTMPP at a temperature from about 750° to about 800° centigrade for about 1 hour in an inert atmosphere.

Preferably, the oxygen evolution catalyst is present proximate the electrolyte side of the electrode in an effective amount up to about 0.35 parts per 1 part carbon particles, and more particularly from about 0.2 to about 0.35 parts per 1 part carbon particles. The oxygen evolution catalyst is preferably present proximate the air side of the electrode in an effective amount up to about 4.0 parts per 1 part carbon particles, and more particularly from about 0.3 to about 4.0 parts per 1 part carbon particles. The oxygen reduction catalyst is preferably present in the active layer proximate the electrolyte side and proximate the air side in an effective amount up to about 2.5 parts per 1 part carbon particles, and more particularly from about 0.02 to about 2.5 parts per 1 part carbon particles. More preferably, the oxygen evolution catalyst is present in the first sublayer 25 in an effective amount up to about 0.35 parts per 1 part carbon particles, and more particularly from about 0.2 to about 0.35 parts per 1 part carbon particles. Also more preferably, the oxygen evolution catalyst is present in the second sublayer 28 in an amount up to about 4.0 parts per 1 part carbon particles, and more particularly from about 0.3 to about 4.0 parts per 1 part carbon particles. The oxygen reduction catalyst is preferably present in the first and second sublayers 25 and 28 of the active layer in an effective amount up to about 2.5 parts per 1 part carbon particles, and more particularly from about 0.02 to about 2.5 parts per 1 part carbon particles.

Suitable conductive filler materials include carbon fibers such as FORTAFIL 5C carbon fibers available from Fortafil Fibers, Inc. and suitable binder/non-wetting agents include polytetrafluoroethylene (TEFLON).

The relative amounts of the components of the air electrode 10 may vary. Preferably however, the oxygen reduction catalyst is present in the active layer 13 in a total amount from about 25 to about 45% by weight of the active layer, the oxygen evolution catalyst is present in the active layer in a total amount from about 3 to 20% by weight of the active layer, the carbon black is present in the active layer in a total amount from about 10 to about 30% by weight of the active layer, polytetrafluoroethylene is preferably present in the active layer in a total amount from about 15 to 35% by weight of the active layer, and the carbon fibers are preferably present in the active layer in a total amount of from about 0 to about 5% by weight of the active layer. The oxygen evolution catalysts are preferably present in the active layer 13 in a total amount from about 0.15 to about 0.35 parts per one part of oxygen reduction catalyst. As explained above, the concentrations of the oxygen reduction catalyst and oxygen evolution catalyst vary from the first sublayer 25 to the second sublayer 28 of the air electrode active layer 13. However, the total amount of oxygen evolution catalyst in the first sublayer 25 of the active layer 13 is preferably less than about 5% by weight of the first sublayer. When present in amounts of about 5% by weight or more of the first sublayer 25, the electrode 10 may begin to produce pockets of gas between the electrolyte side 64 of the active layer and the electrolyte.

The active layer 13 of the bifunctional air electrode 10 preferably includes each of the oxygen reduction catalysts, CoTMPP, $LaNi_{0.9}Co_{0.1}O_y$, Ag, and $Co_xO_y$ and each of the oxygen evolution catalysts, WC with 1 to 20% by weight Co, $FeWO_4$, and NiS. Preferably, CoTMPP is present in an amount from about 0.3 to about 2% by weight of the active layer 13, $LaNi_{0.9}Co_{0.1}O_y$ is present in an amount from about 4 to about 10% by weight of the active layer, Ag is present in an amount from about 0 to about 4% by weight of the active layer, $Co_xO_y$ is present in an amount from about 18 to about 32% by weight of the active layer, WC with 1 to 20% by weight Co is present in an amount from about 1 to about 7% by weight of the active layer, $FeWO_4$ is present in an amount from about 1 to about 7% by weight of the active layer, and NiS is present in an amount from about 1 to about 7% by weight of the active layer.

The current collector 16 is preferably a nickel plated CRS screen or nickel expanded metal. Although only one current collector 16 is shown in FIG. 2, it should be understood that multiple current collectors can be incorporated into a single active layer.

The wet-proofing layer 19 is substantially liquid-impermeable and gas-permeable. The wet-proofing layer 19 preferably includes untreated carbon black such as Shawinigan acetylene black in an amount from about 40 to about 60% by weight, a binding/non-wetting agent such as polytetrafluoroethylene in an amount from about 30 to about 60% by weight, and carbon fibers in an amount from about 5 to about 10% by weight.

The bifunctional air electrode 10 can be made by conventional methods known to those skilled in the art such as filtration using methanol or water or both as a solvent and the wet paste method using methanol or water as a solvent. U.S. Pat. No. 4,152,489 discloses a suitable wet paste method and the disclosure of such patent is expressly incorporated herein by reference.

Although the air electrode 10 includes an active layer with only two sublayers 25 and 28, it should be understood that bifunctional air electrodes of the present invention may include more than two sublayers in the active layer. It should further be understood that the present invention could be embodied in an air electrode having one or more layers constructed according to the invention plus other layers.

The sublayers 25 and 28 of the active layer 13 and the wet-proofing layer 19 are formed in separate steps one on top of the other. Generally described, the wet paste method for forming the air electrode 10 is as follows. The components of the first sublayer 25 of the active layer 13 are mixed with deionized water to form a paste. The paste is then spread over and through the metal current collector 16. The current collector 16 preferably has a thickness from about 0.005" to about 0.050". After pasting, substantially all excess active material is removed from the edges of the current collector by scrapping and the paste is dried by heating the sublayer at a temperature of about 85° centigrade. The second sublayer 28 is formed in the same manner directly on top of the first sublayer 25. Then, the wet-proofing layer 19 is formed on top of the second sublayer 28 of the active layer 13 in the same manner. The entire air electrode 10 is then flat-bed pressed at a temperature of between 250° centigrade and 350° centigrade at a pressure from about 0.5 ton per square inch to about 7.5 tons per square inch for an effective time period to ensure complete consolidation and lamination without substantial compaction, generally from 5 to about 20 minutes.

The following Examples 1 and 2 are designed to disclose particular embodiments of the present invention and teach one of ordinary skill in the art how to carry out the present invention.

EXAMPLE 1

A bifunctional air electrode having an active layer with first and second sublayers and a wet-proofing layer in accordance with the embodiment described above is formed by the above-described wet paste method. The composition of each layer is shown in Table 1. The potassium hydroxide is added as a wetting agent and the ammonium carbonate is added as a pore former. The ammonium carbonate substantially sublimes during heating and compaction of the electrode. AB-50 refers to SHAWINIGAN AB-50 carbon black available from Chevron Chemical. The current collector is a sheet of nickel expanded metal having a thickness of 0.01 inches and has dimensions of 3 inches by 5 inches. The first sublayer of the active layer has a thickness of about 0.02 inches, the second sublayer of the active layer has a thickness of about 0.025 inches and the third sublayer has a thickness of about 0.015 inches. The three layers are formed, dried at a temperature of about 85° centigrade for 120 minutes, and then flat-bed pressed at a temperature of about 300° centigrade and a pressure of about 0.5 tons per square inches for 10 minutes.

TABLE 1

| Electrode Composition | | | |
|---|---|---|---|
| 1st Sub-Layer of Active Layer: | | | |
| AB50 with 2% CoTMPP + 8% Ag | 19.5% | $Co_xO_y$ | 23.6% |
| $LaNi_{.9}Co_{.1}O_y$ | 4.8% | WC-12% Co | 1.4% |
| $FeWO_4$ | 1.4% | NiS | 1.4% |
| KOH | 8.4% | $NH_4HCO_3$ | 14.2% |
| Carbon Fibers | 2.8% | Teflon | 22.3% |
| 2nd Sub-Layer of Active Layer: | | | |
| AB50 with 2% CoTMPP + 8% Ag | 20.7% | $Co_xO_y$ | 22.6% |
| $LaNi_{.9}Co_{.1}O_y$ | 4.6% | WC-12% Co | 3.1% |
| $FeWO_4$ | 3.1% | NiS | 3.1% |
| KOH | 7.5% | $NH_4HCO_3$ | 13.6% |
| Carbon Fibers | 2.7% | Teflon | 19.0% |
| Wet-Proofing Layer: | | | |
| Untreated AB50 | 50.4% | Carbon Fiber | 7.2% |
| Teflon | 42.5% | | |

The electrode from Example 1 can be incorporated into a zinc-air cell. The cell discharges a current of >2 amps on the first discharge cycle, is rechargeable at a potential of <2 volts, and operates for >100 charge-discharge cycles without appreciable pockets of gas forming between the electrolyte side of the air electrode and the electrolyte.

EXAMPLE 2

A bifunctional electrode as in Example 1 is made except that the electrode had the composition shown in Table 2.

TABLE 2

| Electrode Composition | | | |
|---|---|---|---|
| 1st Sub-Layer of Active Layer: | | | |
| AB50 with 2% CoTMPP | 1.37 g | $Co_xO_6$ | 1.66 g |
| $LaNi_{.9}Co_{.1}O_y$ | 0.34 g | WC-12% Co | 0.11 g |
| $FeWO_4$ | 0.11 g | NiS | 0.11 g |
| KOH | 0.59 g | $NH_4HCO_3$ | 1.0 g |
| Carbon Fibers | 0.21 g | Teflon | 1.51 g |
| 2nd Sub-Layer of Active Layer: | | | |
| AB50 with 8% Ag | 30.0 g | | |

TABLE 2-continued

| Electrode Composition | |
|---|---|
| WC-12% Co | 4.5 g |
| FeWO$_4$ | 4.5 g |
| NiS | 4.5 g |
| Teflon | 12.0 g |
| Wet-Proofing Layer: | |
| Untreated AB50 | 27.0 g |
| Teflon | 15.0 g |

The electrode from Example 2 can also be incorporated into a zinc-air cell. The cell discharges a current of >2 amps. on the first discharge cycle, is rechargeable at a potential of <2 volts, and operates for >100 charge-discharge cycles without appreciable pockets of gas forming between the electrolyte side of the air electrode and the electrolyte.

Although the foregoing Examples disclosed the use of bifunctional electrodes with zinc-air cells, it should be understood that the bifunctional electrode of the present invention can be used with any metal-air cells. Other metal-air cells with which the present invention can be used include nickel, cadmium, hydrogen, and metal-hydride cells. Furthermore, the electrode of the present invention is functional over a wide range of current densities and can be used in high power applications such as motor vehicles. The electrode of the present invention is also not limited to use with smaller size metal air cells but can also be formed into large cathode sheets for use with large metal-air cells. In addition, although the metal-air cell 40 described above has only a single air electrode, a metal-air cell having two air electrodes of the present invention adjacent opposite sides of a single anode is contemplated.

It should be understood that the foregoing will relate to a preferred embodiment of the present invention, and that numerous changes may be made therein without departing from the spirit and scope of the invention as defined by the following claims.

We claim:

1. A bifunctional air electrode for use in a secondary metal-air electrochemical cell comprising:
an active layer having an electrolyte side and an air side and comprising an oxygen reduction catalyst having a first oxygen evolution potential and an oxygen evolution catalyst having a second oxygen evolution potential less than the first oxygen evolution potential, the oxygen evolution catalyst being present in a greater concentration proximate the air side than proximate the electrolyte side;
a current collector in electrical contact with the active layer; and
a wet-proofing layer laminated to the air side of the active layer.

2. A bifunctional air electrode as in claim 1 wherein the oxygen reduction catalyst is present in a greater concentration proximate the electrolyte side than proximate the air side.

3. A bifunctional air electrode as in claim 1 wherein the oxygen reduction catalyst has an oxygen evolution potential greater than 2.1 volts and the oxygen evolution catalyst has an oxygen evolution potential less than 2.0 volts.

4. A bifunctional air electrode as in claim 1 wherein the concentration of the oxygen evolution catalyst in the active layer is at least about 2% greater at the air side than at the electrolyte side.

5. A bifunctional air electrode as in claim 2 wherein the concentration of the oxygen evolution catalyst in the active layer is at least about 2% greater at the air side than at the electrolyte side and the concentration of the oxygen reduction catalyst in the active layer is at least 0.5% greater at the electrolyte side than at the air side.

6. A bifunctional air electrode as in claim 1 wherein the oxygen reduction catalyst is selected from the group consisting of silver, cobalt oxides, transition metal macrocyclics, spinels, and perovskites, and the oxygen evolution catalyst is selected from the group consisting of WC, FeWO$_4$, NiS, and mixtures thereof.

7. A bifunctional air electrode as in claim 1 wherein the oxygen reduction catalyst includes CoTMPP.

8. A bifunctional air electrode as in claim 1 wherein the oxygen evolution catalyst includes WC with 1 to 20% by weight fused Co.

9. A bifunctional air electrode as in claim 7 wherein the oxygen evolution catalyst includes WC with 1 to 20% by weight fused Co.

10. A bifunctional air electrode as in claim 1 wherein the oxygen reduction catalyst includes CoTMPP, LaNi$_{1-x}$Co$_x$O$_y$, Ag, and Co$_x$O$_y$, and the oxygen evolution catalyst includes WC with 1 to 20% by weight Co, FeWO$_4$, and NiS.

11. A bifunctional air electrode as in claim 10 wherein the active layer further comprises carbon black, carbon fibers and polytetrafluoroethylene.

12. A bifunctional air electrode as in claim 1 wherein the active layer further comprises carbon particles and a non-wetting agent/binder.

13. A bifunctional air electrode as in claim 1 wherein the active layer comprises a first sublayer positioned adjacent to the electrolyte and a second sublayer positioned adjacent to the wet-proofing layer, the oxygen evolution catalyst being present in a greater concentration in the second sublayer than in the first sublayer.

14. A bifunctional air electrode as in claim 13 wherein the oxygen reduction catalyst is present in a greater concentration in the first sublayer than in the second sublayer.

15. A bifunctional air electrode as in claim 1 wherein the oxygen reduction catalyst and the oxygen evolution catalyst are present substantially throughout the active layer.

16. A bifunctional air electrode as in claim 1 wherein the oxygen reduction catalyst is present in an amount from about 25 to about 45% by weight of the active layer and the oxygen evolution catalyst is present in an amount from about 3 to about 20% by weight of the active layer and further comprising carbon black in an amount from about 10 to about 30% by weight of the active layer, polytetrafluoroethylene in an amount from about 15 to about 35% by weight of the active layer, and carbon fibers in an amount from about 2 to about 5% by weight of the active layer.

17. A bifunctional air electrode as in claim 16 wherein the oxygen reduction catalyst includes CoTMPP in an amount from about 0.3 to about 2% by weight of the active layer, LaNi$_{1-x}$Co$_x$O$_y$ in an amount from about 4 to about 10% by weight of the active layer, Ag in an amount from about 1 to about 4% by weight of the active layer, and Co$_x$O$_y$ in an amount from about 18 to about 32% by weight of the active layer, and the oxygen evolution catalyst includes WC with 1 to 20% by weight Co in an amount from about 1 to about 7% by weight of the active layer, FeWO$_4$ in an amount from about 1 to about 7% by weight of the active layer, and NiS in an amount from about 1 to about 7% by weight of the active layer.

18. A bifunctional air electrode as in claim 1 wherein the oxygen reduction catalyst is present in the active layer of the electrode in a total amount effective to produce a predetermined amount of current from the cell on the first discharge cycle of the cell and the oxygen evolution catalyst is present in an amount effective to carry the electrolytic recharge reaction of the cell and exclude the oxygen reduction catalyst from the electrolytic recharge reaction.

19. A bifunctional electrode as in claim 1 wherein the oxygen evolution catalyst is present proximate the electrolyte side of the electrode in a concentration less than about 5% by weight.

20. A bifunctional electrode as in claim 1 wherein the active layer further comprises carbon particles and the oxygen evolution catalyst is present proximate the electrolyte side of the electrode in an effective amount up to about 0.35 parts per 1 part carbon particles and is present proximate the air side of the electrode in an effective amount up to about 4.0 parts per 1 part carbon particles.

21. A bifunctional electrode as in claim 20 wherein the oxygen reduction catalyst is present in the active layer in an effective amount up to about 2.5 parts per 1 part carbon.

22. A bifunctional electrode as in claim 13 wherein the active layer further comprises carbon particles and the oxygen evolution catalyst is present in the first sublayer in an effective amount up to about 0.35 parts per 1 part carbon particles and is present in the second sublayer in an effective amount up to about 4.0 parts per 1 part carbon particles.

23. A bifunctional electrode as in claim 22 wherein the oxygen reduction catalyst is present in the active layer in an effective amount up to about 2.5 parts per 1 part carbon.

* * * * *